April 17, 1928.  1,666,170
J. R. FITZPATRICK
VEHICLE SIDE AND WINDOW WASHING MACHINE
Filed July 27, 1926  3 Sheets-Sheet 1
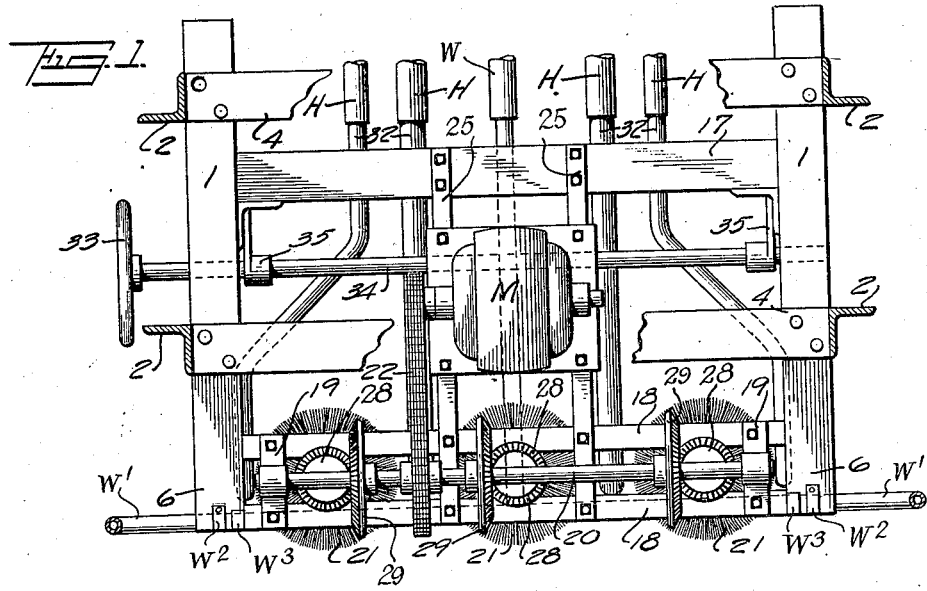
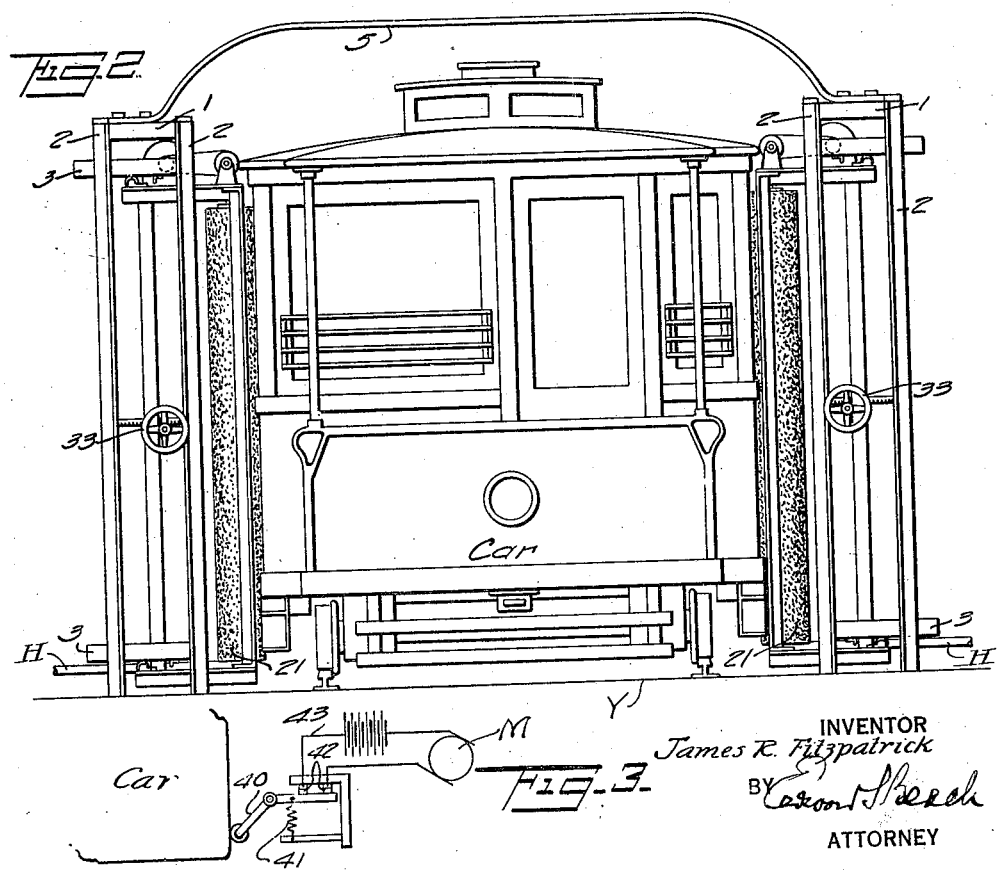
INVENTOR
James R. Fitzpatrick
BY
ATTORNEY

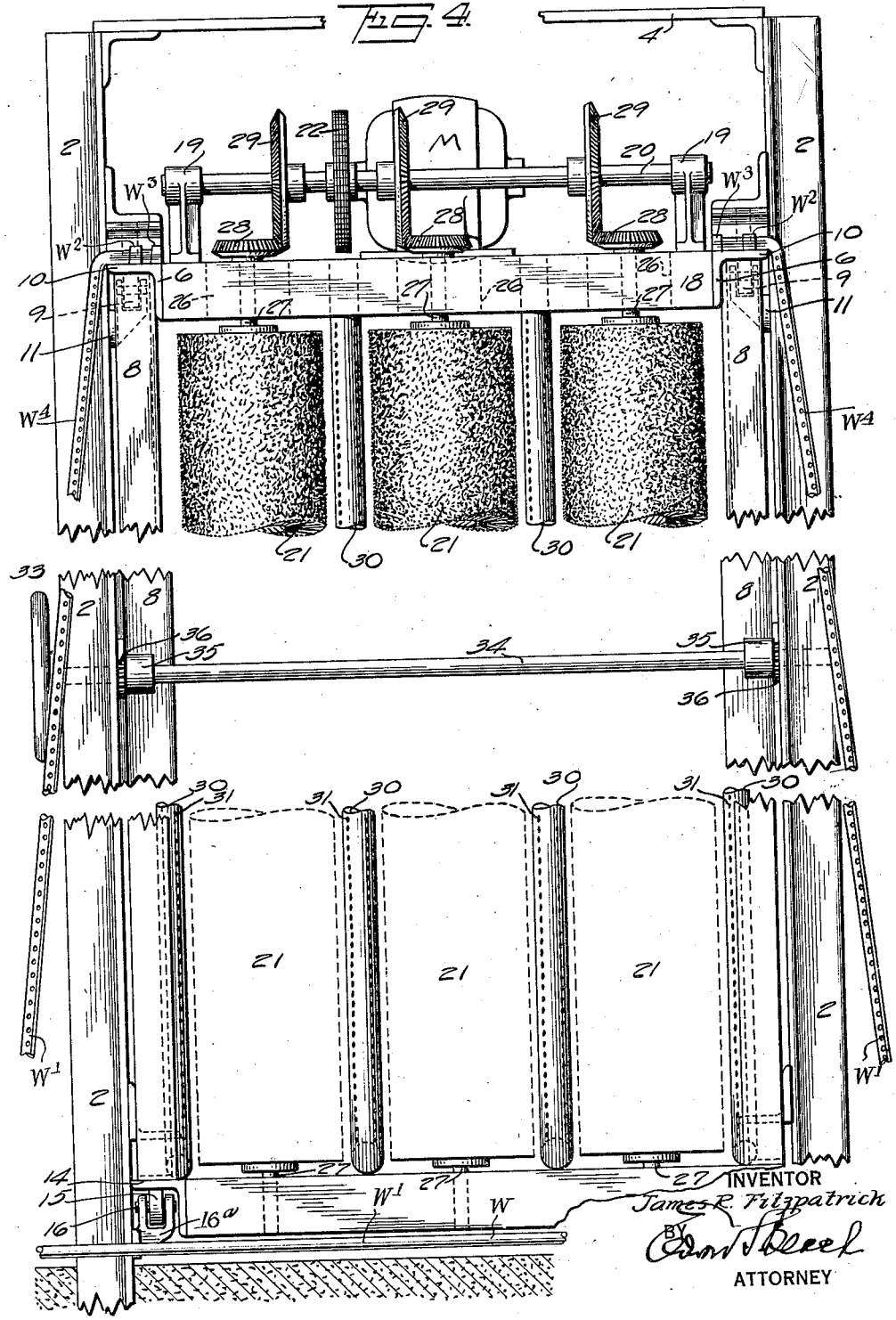

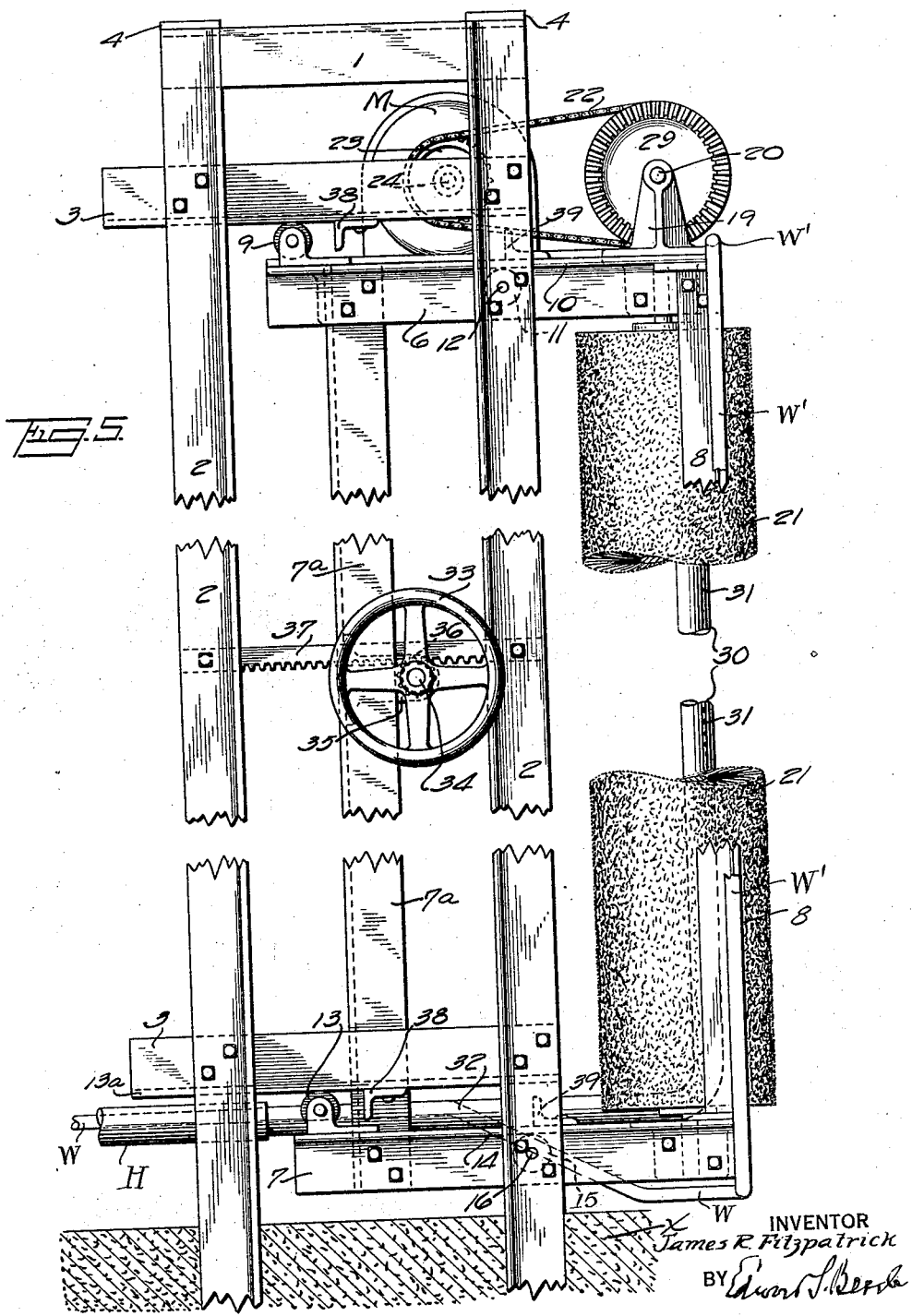

Patented Apr. 17, 1928.

1,666,170

UNITED STATES PATENT OFFICE.

JAMES R. FITZPATRICK, OF NEW YORK, N. Y.

VEHICLE SIDE AND WINDOW WASHING MACHINE.

Application filed July 27, 1926. Serial No. 125,139.

This invention relates to a vehicle side and window washing machine. Its main object is to produce an upstanding, car side and window washing apparatus which can be duplicated in transversely opposed, spaced apart pairs, between which railroad cars, street cars, omnibuses and various other types of vehicles, may be run for simultaneously washing the opposed sides and windows.

In the accompanying drawings, illustrating one form of apparatus in which my invention is embodied, Fig. 1 is a top plan view of an upstanding, stationary, main frame; and a brush, water conduit and motor carrying carriage mounted in the main frame.

Fig. 2 shows an end elevation of a car between, and having its opposed sides each in contact with, a vertical, scrubbing brush carried by a carriage supported in an upstanding, stationary, main frame at each side of the car body.

Fig. 3 is a wiring diagram of the motor starting and stopping apparatus which is actuatable by contact with a passing vehicle side.

Fig. 4 is an inward, partial side elevation of one of the washing machines and shows the carriage provided with three vertical brushes and vertical, lengthwise perforated water conduits; and the brush driving mechanism.

Fig. 5 is an elevation, looking at an end of a main frame and at corresponding members of the brush, water conduit and carrying carriage, showing the means for adjusting the carriage towards and from the car passageway, and the brush driving mechanism.

In the drawings, the stationary main frame is indicated by 1 applied to each of its two, spaced apart, parallel, top horizontal members that extend in the direction of the side of the car to be washed. (Fig. 1.)

The upstanding, main frames are higher than the roof of the car which is to be passed between two opposed main frames. As the two main frames and the two brush, water conduit and motor carrying carriages are of identical construction, description of one main frame and of one carriage will suffice for both main frames and both carriages.

The main frame and carriage construction, as shown, is in part of angle irons and other metal members; but both the main frames and the carriages may be made, to a greater or lesser extent, of wood if so desired.

Each top member 1 is supported by a pair of vertical posts 2 the under ends of which, as shown, are anchored in flooring X, which forms a roadway between the two washing machines. This roadway may be provided with track rails, as shown, if so desired. Each pair of posts 2 are tied together and spaced apart, adjacent the flooring, and also at their upper portions, by horizontal carriage track-forming, under and upper plates 3, extending in the direction of a car side; or, in other words, at right angles to the track or flooring between the two washing machines.

The two top members 1 of each main frame are also connected together by top bars 4, whereby each main frame is made a rigid, four-posted structure. The four-posted main frame, at one side of the car passageway between the two washing machines, may be connected at its top with the top of the corresponding main frame, at the other side passageway, by an overhead brace 5, underneath which a car may be passed between the washing machines.

Each main frame is provided with a preferably adjustable, motor, water conduit and brush carrying carriage.

Each carriage includes a pair of parallel, horizontal, spaced apart, wheel carrying top bars 6, (Fig. 5) extending in the direction of the passageway. Below each top bar 6, there is an under and therewith parallel, horizontal, wheel carrying under bar 7. Each top bar 6 is connected to an underlying under bar 7 by a vertical member $7^a$, and also by a therewith parallel, vertical member 8, the two members 8 being alined on the inward side of the carriage (Figs. 4 and 5) and the two members 7 being alined at an outward portion of the carriage.

Each upper bar 6 is provided, on its upper side, with a wheel 9 which tracks on the under edge of an upper main frame plate 3. The upper edge of each bar 6 has a horizontal wheel bearing flange 10 which rides on wheel 11, pivoted at 12, to an inward post 2 of the main frame.

Each under bar 7 is provided with a wheel 13 which tracks on an under flange $13^a$ of an under main frame plate 3; and is also provided with a horizontal, wheel bearing flange 14 which slides on an under wheel 15, pivoted at 16 in a bracket 16ª on a main frame post 2.

The wheels 9 and 13 are at the outward, and the wheels 11 and 15 are at the inward portion, of the carriage.

The two top bars 6 of the carriage are transversely connected, in a direction parallel with the passageway, by a horizontal plate 17, (Fig. 1) and by a therewith parallel pair of inward plates 18. The latter are connected, in right angular direction to them, by upstanding shaft bearings 19 for the brush driving shaft 20 which is parallel to the passageway, and is provided with a sprocket over which a sprocket chain 22 travels to a sprocket wheel 23, on the shaft 24 of an electric motor M. This motor is supported on horizontal plates 25 which connect the plates 17 and 18. At their under ends, the inward vertical members 8 of the carriage are transversely connected by horizontal, spaced apart plates 19ª, one of each being directly below an inward top plate 18.

The inward top plates 18 support, between them, and the inward under plates 19ª support, between them, a series of journal boxes 26 for the upper and under end portions of the vertical brush shafts 27. The upper end of each brush shaft has a horizontal, bevelled, gear wheel 28 in mesh with a bevelled driving gear 29 on shaft 20. Three vertical, revoluble brushes 21 are shown, spaced apart one from another. The brushes each have a length equal to or greater than the height of a car side.

The carriage carries a number of fixed, vertical, water conduits 30, each lengthwise perforated at 31, for discharge of water into a vertical bight which each circular brush forms with a passing car side engaged by the brushes. Each conduit 30 communicates with a water supply conduit 32 fixed to the carriage and adapted for connection to a flexible hose H.

The opposite carriages are preferably adjustable away from and towards the passageway, in order to bring the brushes at each side of the car, into greater or less pressure against opposite sides of the car and the windows in the car sides, and also in order to adjust the brushes to car bodies varying in width. Accordingly, each main frame is provided with a hand wheel 33 on a shaft 34, parallel with the passageway. The shaft is journalled in brackets 35 on the vertical carriage bars 7ª; and is provided, adjacent each bar 7ª, with a gear wheel 36, in mesh with a horizontal rack 37 which connects each pair of main frame posts 2. Stops 38 on the main frame members 3 cooperate with stops 39 on the bars 6 of the carriage, to limit the extent of the carriage adjustment.

As shown on Fig. 3, the main frame carries a spring pressed, electric switch-arm 40, the spring being indicated by 41. The switch-arm projects into the path of the advancing end of the car. When the switch-arm is engaged by the car, the switch is moved, to start the motor. When the car passes out of contact with the switch-arm, the spring returns the switch-arm into position to shut off the motor. When the switch-arm is swung by the advancing end of the car, it contacts with the electrodes 42, closing the motor circuit 43 and starts the motor. When the switch-arm is out of contact with the electrodes, the motor circuit is open.

Obviously, the car sides and windows of car body may be thoroughly washed and scrubbed by rotation of the brushes and water from the conduit perforations 31, which extend the full length of the brushes; and the brushes, through inward adjustment of the carriages, may be moved appropriately to bear on car sides and windows as desired.

Preferably, each brush carriage is provided with a rinsing water pipe W, the intake portion of which is parallel with the water pipes H. The front end of the rinsing water pipe W communicates with a transverse pipe W' which extends, below the lower ends of the brushes and beneath the inward ends of the wheel carriage, under bars 7 to the sides of the brush carriage; then each horizontal portion of the pipe W' is bent upwardly and slantingly inwards. The upper portion of each upwardly and inwardly extending portion of the pipe W' is then bent horizontally inwards and anchored by a clamp W² to an end of a top bar 6. Each end of the inward horizontal extension of the pipe inwardly of the clamp W² is provided with a cap W³. The upwardly and inwardly extending portions of the pipe W', one such portion at each side of the brush carriage, is frequently perforated at W⁴ for ejection of rinsing water against the vehicle sides, the washing water pipes 30 discharging against the brushes, which are positioned against the upwardly extending portions W' of the rinsing water pipe. It discharges rinsing water against the washed and scrubbed surface; is fixed to the carriage and adapted for connection with a flexible hose H.

Various changes in the forms of apparatus shown may be made, without departure from the invention, as set forth in the following claims.

What I claim is:

1. In a vehicle side and window washing machine the combination of spaced means defining a vehicle passageway, each of such means comprising an upstanding stationary frame for a brush carriage; of a brush carriage supported by said frame and movable toward and away from the passageway; cooperating means between said frame and carriage for supporting the latter movably on said frame; a plurality of vertical shafts revolubly journalled in said carriage; brushes carried by said shafts adapted to clean a vehicle by contact therewith; brush driving mechanism carried by said carriage and movable therewith with respect to said frame, said mechanism comprising motor means and gearing operated thereby for driving the brushes; a water supply apparatus for the brushes; and means under control of an operator for adjusting the brushes into and out of working position, toward and away from the passageway.

2. In a vehicle side and window washing machine the combination of spaced means defining a vehicle passageway, each of such means comprising an upstanding stationary frame for a brush carriage; of a brush carriage supported by said frame and movable toward and away from the passageway; cooperating means between said frame and carriage for supporting the latter movably on said frame; a plurality of vertical shafts revolubly journalled in said carriage; brushes carried by said shafts adapted to clean a vehicle by contact therewith; brush driving mechanism carried by said carriage and movable therewith with respect to said frame, said mechanism comprising motor means and gearing operated thereby for driving the brushes; a water supply apparatus for the brushes; a rack carried by said upstanding frame; a shaft journalled in said movable carriage, and a pinion mounted on the shaft in engagement with the rack, whereby when the shaft is rotated the said carriage and brushes will be moved into and out of working position.

3. In a vehicle side and window washing machine the combination of spaced means defining a vehicle passageway, each of such means comprising an upstanding, substantially rectangular frame provided with upper and lower trackways; a brush carriage; rollers carried by said frame and carriage for engaging the carriage and frame respectively thereby to movably support said carriage in the frame, cooperating rack and pinion means on the frame and carriage for adjusting the latter, a plurality of vertical shafts revolubly journalled in the carriage adjacent the vehicle passageway, means for delivering water to the said brushes and to the vehicle being cleaned, and means for driving the brushes, said means comprising a motor and gearing actuated thereby, the brush driving means being carried entirely by the movable carriage.

Signed at Staatsburg, in the county of Dutchess and State of New York, this 22nd day of July, A. D., 1926.

JAMES R. FITZPATRICK.